United States Patent [19]

DeLeon

[11] 3,940,517
[45] Feb. 24, 1976

[54] POLYISOCYANURATE FOAM, CATALYST COMPOSITION AND PROCESS FOR PRODUCING SUCH

[75] Inventor: Alberto DeLeon, St. Petersburg, Fla.

[73] Assignee: The Celotex Corporation, Tampa, Fla.

[22] Filed: Apr. 16, 1974

[21] Appl. No.: 461,271

Related U.S. Application Data

[63] Continuation of Ser. No. 322,841, Jan. 11, 1973, abandoned.

[52] U.S. Cl. ............ 427/373; 156/78; 260/2.5 AW; 427/293
[51] Int. Cl.² ........................................ C08G 18/02
[58] Field of Search ........ 260/2.5 AW; 117/161 KP, 117/105.3; 427/424, 373; 156/78

[56] References Cited
UNITED STATES PATENTS

| | | | |
|---|---|---|---|
| 3,676,380 | 7/1972 | McLaughlin et al. | 260/2.5 AW |
| 3,793,240 | 2/1974 | Smith et al. | 260/2.5 AW |
| 3,814,659 | 6/1974 | Nadeau | 161/161 |

FOREIGN PATENTS OR APPLICATIONS

| | | | |
|---|---|---|---|
| 1,146,661 | 4/1966 | United Kingdom | 260/2.5 AW |

*Primary Examiner*—Ralph S. Kendall
*Assistant Examiner*—John D. Smith
*Attorney, Agent, or Firm*—James W. Grace; David R. Murphy

[57] ABSTRACT

Polyisocyanurate foams are produced by admixing from separate sources, an organic polyisocyanate, a diol, and a catalytic composition which comprises an alkali metal carboxylate and polyoxyethylene polyol.

13 Claims, 1 Drawing Figure

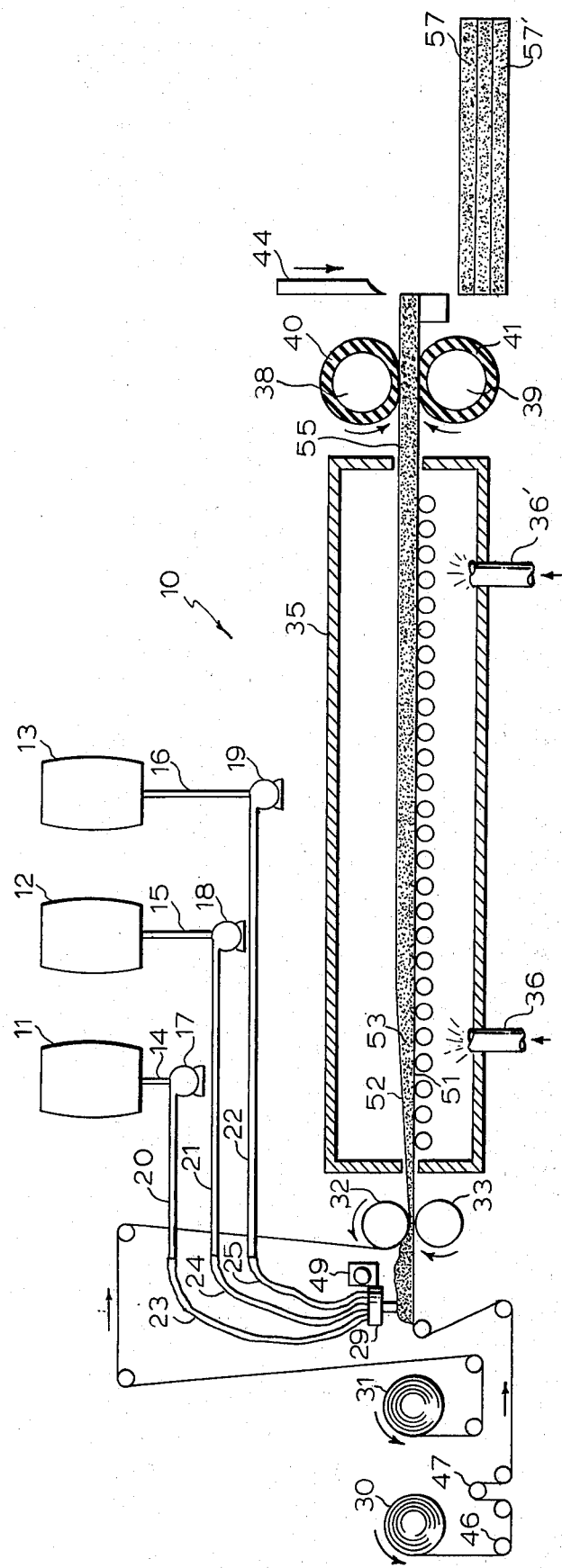

POLYISOCYANURATE FOAM, CATALYST COMPOSITION AND PROCESS FOR PRODUCING SUCH

CROSS REFERENCE TO RELATED APPLICATIONS

This application is a continuation of previously filed copending application Ser. No. 322,841, filed on Jan. 11, 1973, now abandoned.

Polyisocyanurate foams containing a small amount of a polyol are known in the art and are described for example in United Kingdom Pat. No. 1,155,768. Furthermore, alkali metal carboxylates and especially potassium-2-ethyl hexoate, more commonly known as potassium octoate, is a known trimerization catalyst. However, the potassium octoate is most often mixed with the polyol since the solubility of the alkali metal carboxylate in the polyol is generally sufficient to provide the entire composition with a sufficient amount of alkali metal carboxylate to trimerize the polyisocyanate. However, admixing the alkali metal carboxylate with the polyol is completely unsuitable for commercial operations for a number of reasons. First, the ratio of the alkali metal carboxylate to the polyol will be fixed for any given composition. Therefore, during processing with any given mixture, it is impossible to independently vary the ratio of alkali metal carboxylate to polyisocyanate independently of the ratio of polyol to polyisocyanate. Adding pure alkali metal carboxylate to the reaction mixture is not practical since pure alkali metal carboxylate is a solid. This solid does not become homogeneously distributed throughout the reaction mixture sufficiently rapidly to evenly catalyze the trimerization reaction. It is also known to add separately to the reaction mixture a catalyst composition comprising the alkali metal carboxylate and a solvent therefor. However, past solvents have in general resulted in undesirable properties in the resultant foam, such as an undesirably high friability, an undesirably great flammability, and a non-uniform resultant foam.

It is therefore an object of the present invention to provide an improved process for producing polyisocyanurate foams which are substantially free of the disadvantages of prior processes.

Another object is to provide an improved process for producing polyisocyanurate foam wherein the ratio of the polyol to the polyisocyanate can be varied independently of the ratio of the catalyst to the composition.

A further object is to provide an improved process wherein the resultant foam has a friability less than 20%.

A still further object is to provide an improved process wherein the resultant foam has a low flammability.

Yet another object is to provide an improved process wherein the resultant foam has uniform characteristics.

Still another object is to provide an improved polyisocyanurate foam.

Still another object is to provide an improved catalytic composition for the trimerization of polyisocyanates to produce polyisocyanurates.

Additional objects and advantages of the present invention will be apparent to those skilled in the art by reference to the following detailed description thereof and the single FIGURE of the drawings wherein there is schematically shown an apparatus suitable for practicing the process of the present invention.

The above and other objects are accomplished according to the present invention by the steps of:
I. admixing from separate sources, an organic polyisocyanate; a diol; a blowing agent; optionally a surfactant; and a catalyst composition comprising an alkali metal carboxylate and polyoxyethylene polyol having a molecular weight between 100 and 300 and then
II. recovering the resultant polyisocyanurate foam.

THE ORGANIC POLYISOCYANATE

In the broadest aspect of the present invention, any organic polyisocyanate can be employed. The preferred organic polyisocyanate is polymethylene polyphenylisocyanate having the indicated functionality and indicated equivalent weight. Those polymethylene polyphenylisocyanates having a functionality of less than 2.1 are generally not acceptable because the resultant foams exhibit an undesirably high friability. Polymethylene polyphenylisocyanates having a functionality greater than 3.2 also produce foams of too great a friability. Therefore, the polymethylene polyphenylisocyanates of the present invention generally having a functionality of 2.1 to 3.2 and preferably 2.5 to 3.2.

Polymethylene polyphenylisocyanates having an equivalent weight less than 120 tend to produce foams having too great a friability. Those having an equivalent weight greater than 180 are generally too viscous to make their use practical. Therefore, the polymethylene polyphenylisocyanates employed in the present invention generally have an equivalent weight between 120 and 180 and preferably have an equivalent weight between 130 and 145.

A preferred subclass of polymethylene polyphenylisocyanates especially useful in the present invention are a mixture of those of Formula I:

(I) 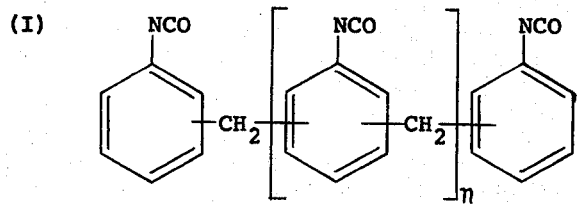

wherein $n$ is an integer from 0 to 8 and wherein the mixture has the above-described functionality and equivalent weight. This mixture should have a viscosity between 100 and 4,000 and preferably 250 to 2500 centipoises measured at 25° C in order to be practical for use in the present invention.

Examples of suitable polymethylene polyphenylisocyanates useful in the present invention include those of Formula I, wherein $n$ is 1 as well as mixtures wherein n can have any value from 0 to 8 as long as the mixture has the specified equivalent weight. One such mixture, e.g. Mondur MRS, has 40 weight percent of $n = 0$, 22 weight percent of $n = 1$, 12 weight percent of $n = 2$, and 26 weight percent of $n = 3$ to about 8. The synthesis of polymethylene polyphenylisocyanates is described in Seeger et al U.S. patent 2,683,730 and in Powers U.S. Pat. No. 3,526,652 at column 3, lines 6–21. It should, therefore, be understood that the polymethylene polyphenylisocyanate available on the market under the tradenames PAPI 20 from Upjohn and E–418 from Mobay can successfully be employed within the spirit and scope of the present invention.

THE DIOL

In the broadest aspects of the present invention, any diol having a low equivalent weight generally between 30 and 100, and preferably between 30 and 70, and having two hydroxyl groups which pass the Zerewitinoff Test, can be employed in the present invention. Triols and higher polyols can be admixed with these diols in minor amounts generally less than 10 percent provided the equivalent weight of the mixture is within the specified range. The preferred diols are those of Formula II:

$$HO-R^1-OH \qquad \qquad II$$

wherein $R^1$ is selected from the group consisting of lower alkylene and lower alkoxyalkylene with at least two carbon atoms. Examples of suitable diols include, among others, ethylene glycol, 1,2-propanediol, 1,3 propanediol; 1,4-butanediol; diethylene glycol, dipropylene glycol, dimethylol dicyclopentadiene, 1,3-cyclohexanediol; and 1,4-cyclohexanediol. Ethylene glycol and diethylene glycol are preferred.

In order to ensure complete reaction, the polymethylene polyphenylisocyanate and the diol are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

ALKALI METAL CARBOXYLATES

In the broadest aspects of the present invention, any alkali metal carboxylate can be employed, however the preferred alkali metal carboxylates are those of Formula III:

$$M-\underset{\underset{O}{\|}}{O}C-R^2 \qquad \qquad III$$

wherein:

M is an alkali metal and $R^2$ is alkyl of 2 to 30 carbon atoms. The preferred alkali metal carboxylates are potassium salts of saturated aliphatic monocarboxylic acids of 2 to 12 carbon atoms, examples of which include among others:
potassium-2-ethylhexoate also known as potassium octoate,
potassium acetate,
potassium decanoate,
potassium butyrate,
potassium isobutyrate,
potassium nonate,
potassium stearate.
Other suitable but less preferred alkali metal carboxylates include among others:
sodium octoate,
lithium stearate,
sodium caprioate,
lithium octoate.

The preferred alkali metal carboxylate is potassium-2-ethylhexoate.

THE POLYOXYETHYLENE POLYOL

The polyoxyethylene polyol useful in the present invention is the ethylene oxide condensate of a lower polyhydric alcohol. Examples of suitable lower polyhydric alcohols include ethylene glycol, diethylene glycol, 1,4-butane diol, 1,3-butane diol, dipropylene glycol, glycerol, and trimethylolpropane. Ethylene glycol is preferred. The polyoxyethylene polyol must have a molecular weight between 150 and 450 and preferably between 200 and 300. At lower molecular weights, the flame retardancy of the resultant foam is adversely affected, whereas at higher molecular weights, a non-uniform foam results. The preferred polyoxyethylene polyols are those of Formula IV:

$$HO-(CH_2CH_2O)_nH \qquad \qquad IV$$

wherein $n$ is an integer from 3 to 10 inclusive and preferably from 4 to 7.

In the broadest aspects of the present invention, the alkali metal carboxylate and the polyoxyethylene polyol can be mixed in widely varying ratios, however, they are generally mixed in ratios of 1:1 to 1:10, and preferably 1:2 to 1:6. At much lower ratios an inordinately large amount of catalyst composition must be employed in order to catalyze the reaction, whereas at much higher ratios the viscosity of the resultant catalytic composition is so high that it becomes difficult to mix the catalytic composition with the remainder of the components which results in incomplete mixing and therefore a foam of non-uniform properties. Within the above-described range the viscosity of the catalytic composition is between 200 to 800 centipoises at 25°C.

OTHER COMPONENTS IN THE CATALYTIC COMPOSITION

The catalytic composition of the present invention can contain a wide variety of components in addition to the alkali metal carboxylate and the polyoxyethylene polyol, as long as these additional components do not significantly adversely affect the catalytic function of the composition or adversely affect the physical properties of the resultant foam. For example, these components can be other materials known to catalyze trimerization reactions. Examples of other known catalytic materials include among others: benzyl trimethylammonium hydroxide, potassium hydroxide, sodium hydroxide, potassium adipate, potassium benzoate, tris(3-dimethylaminopropyl)hexahydro-5-triazine, potassium phthalimide, lead octoate, 1,4-diazabicyclo [2.2.2]octane, N,N-dimethylbenzyl amine, dibutyltin dilaurate, propylene oxide, phenyl glycidyl ether, diglycidyl ether of 2,2-bis(4-hydroxy-phenyl) propane and N,N-dimethylcyclohexylamine.

An especially preferred subclass of additional materials are certain tertiary amino phenols, the preferred species of which is 2,4,6-tris(dimethylaminomethyl)-phenol. A catalytic composition comprising this tertiary amino phenol and potassium-2-ethyl hexoate gives especially desirable results. This catalytic composition is described and claimed in U.S. application Ser. No. 322,842 filed concurrently herewith.

The alkali metal carboxylate and the tertiary amino phenol are generally present in an equivalent ratio of 1:3 to 3:1 and preferably 1:1.5 to 1.5:1. The ideal ratio is 1:1. The equivalent weight is the molecular weight divided by the functionality. The functionality of the alkali metal carboxylate is one. The functionality of the tertiary amino phenol is equal to the number of amino nitrogen atoms present. The catalytic composition is used in an amount to give the desired cream time and firm time. The catalytic composition generally comprises from 0.01 to 5, and preferably from 0.1 to 2, weight percent of the polyisocyanurate foam.

THE BLOWING AGENT

Any blowing agent characteristically employed in similar prior art products can be employed in the composition of the present invention. In general, these blowing agents are liquids having a boiling point between minus 50°C and plus 100°C and preferably between 0°C and 50°C. Examples of suitable blowing agents include, among others, chlorinated and fluorinated hydrocarbons such as $CCl_2F-CClF_2$, $CCl_2F-CF_3$ and fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components. Difluorodichloromethane is the preferred blowing agent having a boiling point outside of the preferred range but within the broad range.

THE SURFACTANT

Successful results have been obtained with silicone-/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for urethane foams are alkoxy silanes, polysilylphosphonates, polydimethyl siloxane and polydimethylsiloxane-polyoxyalkylene block copolymers. For a more detailed explanation of the function of the surfactant in the manufacture of foamed polyurethane and polymethylene polyphenylisocyanate compounds, reference is made to an article entitled "How Silicone Surfactants Affect Polyurethane Foams" in *Modern Plastics*, January 1967 edition, pages 133ff, of which Robert J. Boudreau is the author.

Examples of surfactants useful in the present invention include, among others, polydimethylsiloxane-polyoxyalkylene block copolymers available from the Union Carbide Corporation under the tradenames L-5420 and L-5340 and from the Dow Corning Corporation under the tradename DC-193.

The surfactant generally comprises from 0.05 to 4, and preferably comprises from 0.1 to 2, weight percent of the composition.

THE PROCESS

Referring now to the single FIGURE of the drawings, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent, the polyol tank 12 is charged with the polyol admixed with the surfactant, and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. The pull rolls 38, 39 each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol, the diol, and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

EXAMPLES

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis of a preferred catalytic composition of the present invention.

The following quantities of the following ingredients are combined as indicated.

| Item | Ingredient | Quantity Grams | Gram-moles |
|---|---|---|---|
| A | 2-ethyl-hexanoic acid | 15.2 | 0.104 |
| B | polyoxyethylene glycol | 80.9 | 0.809 |
| C | KOH | 5.8 | 0.104 |

Items A and B are mixed, whereupon Item C is added until the resultant mixture has a pH of 7.0 as determined by a test with red litmus paper. The water of reaction is removed by contacting the reaction mixture with a molecular sieve supplied by the Union Carbide Corporation as Linde 3A.

Item B is the polyoxyethylene glycol supplied by the Union Carbide Corporation under the tradename Carbowax 200 and is the ethylene oxide adduct of ethylene glycol having an average molecular weight of 200; specific gravity 1.27 ± 0.002 at 20°C; refractive index 1.459 ± 0.003 at 25°C and hydroxyl number of 560.

The resultant product is termed catalytic composition A.

EXAMPLE II

The procedure of Example I is repeated except that Item B is replaced by an equal weight of the following other commercially available polyoxyethylene glycols, such as DOW's polyglycol 200, tetraethylene glycol and polyoxyethylene glycol such as Carbowax 200 supplied by Cincinnati Milicon.

EXAMPLE III

This example illustrates the synthesis of a catalytic composition of the present invention employing an ingredient in addition to the alkali metal carboxylate.

The following quantities of the following ingredients are combined as indicated:

| Item | Ingredient | Quantity Grams |
|---|---|---|
| A | catalytic composition A | 100 |
| B | 2,4,6-tris(dimethyl-aminomethylphenol) | 9.5 |

The resultant catalytic composition is termed Catalytic Composition B.

EXAMPLE IV

The procedure of Example I is repeated except that Item A is replaced with an equal weight of the following alkali metal carboxylates to produce the following catalytic compositions.

| Alkali Metal Carboxylate | Designation of Catalytic Composition |
|---|---|
| potassium acetate | C |
| sodium octoate | D |
| potassium butyrate | E |

EXAMPLE V

This example illustrates the desirable physical characteristics of a polyisocyanurate foam produced in accordance with the present invention.

The following quantities of the following ingredients are combined as indicated:

| Item | Ingredient | Quantity Grams |
|---|---|---|
| A | polymethylene polyphenyl isocyanate | 277 |
| B | diethylene glycol | 23 |
| C | fluorotrichloromethane | 52 |
| D | Catalytic Composition A | 12 |
| E | DC-193 | 6 |

Items A through E are mixed in a vessel and permitted to stand, whereupon the mixture autogeneously cures to a polyisocyanurate foam. This foam has a friability of less than 20% and a burn extent of 9.8 inches.

EXAMPLE VI

This example illustrates the practice of the process of the present invention on a commercial scale by reference to the single FIGURE of the drawing. The following quantities of the following ingredients are combined as indicated:

| Item | Ingredient | Parts by Weight |
|---|---|---|
| A | polymethylene polyphenyl iso cyanate | 277 |
| B | $CFCl_3$ | 52 |
| C | diethylene glycol | 23 |
| D | DC-193 | 6 |
| E | Catalytic Composition B | 10 |

Items A and B are mixed with each other and placed in the tank 11. Items C and D are mixed with each other and placed in the tank 12. Item E is placed in the tank 13. The apparatus 10 is provided with kraft paper rolls 30, 31. The oven 35 is heated to a temperature of 150°–200°F. The rolls 38, 39 are started, as well as the pumps 17, 18, and 19 to discharge the contents of the tanks 11, 12, 13 in a weight ratio of 100:9:3. Under these conditions the resultant isocyanurate foam exhibits a cream time of 18 seconds and a firm time of 35 to 45 seconds. Increasing the speed of the pump 19 and therefore the ratio of the catalytic composition to the other components reduces the cream time and the firm time, whereas slowing the pump 19 has the opposite effect. As will be readily apparent, the amount of catalyst added to the composition can be varied independently of the ratio between the polyol and the polyisocyanate. An inspection of the structure 55 indicates the core 53 is uniform.

Glossary

CREAM TIME the time interval beginning with the addition of the catalyst and ending when the composition changes color from dark brown to cream colored. This color change is also accompanied by a simultaneous increase in volume. Unless otherwise indicated, the reactants are mixed at 15°C under ambient conditions of atmospheric pressure and room temperature (25°C).

EQUIVALENT WEIGHT the molecular weight of the component divided by its functionality. For example, ethylene glycol has a molecular weight of 62.07 and has two hydroxyl groups or a functionality of 2. Therefore, the equivalent weight of ethylene glycol is 62.07/2 or approximately 31. The equivalent weight of the polymethylene polyphenylisocyanate is of course determined by dividing the average molecular weight by the average number of isocyanate groups present per molecule. These equivalent weights can also be determined empirically.

FIRM TIME- The time interval between catalyst addition and the firm point. Firm time is measured by periodically pressing by hand the top of the rising foam with a tongue depresser (a stick approximately 6 × ¾ × 1/16 inch). When the tongue depresser no longer penetrates the surface, the time is noted. The elasped time from addition of catalyst to this point is termed the firm time. At times prior to the firm point, the composition has the characteristics of viscous liquid or gel, whereas after the firm point it can be cut and otherwise handled.

BURN EXTENT this is measured in terms of burn extent in the Monsanto Tunnel, as described by M. M. Levy, *Journal of Cellular Plastics*, April 1967, and by H. L. Vandersall, *Journal of Paint Technology*, 39 494 (1967). Conventional non-flame-retardant urethanes burn in excess of 23 inches (length of tunnel), while moderately flame-retardant conventional foams burn 15–20 inches and highly flame-retardant conventional foams burn 10–15 inches in this tunnel.

FRIABILITY the propensity of the foam to break expressed in percent weight loss. This is determined by the ASTM C-421 friability test conducted for 10 minutes.

THERMAL STABILITY the ability of the foam to maintain its weight at elevated temperatures. A temperature of 300°C is used for all tests. Thermal stability is expressed as percent weight loss and is measured by thermogravimetric analysis according to the technique described by J. E. Sheridan et al in the *Journal of Cellular Plastics*, May-June 1971.

OXYGEN INDEX this is the measure of the flammability. The higher the number, the less flammable is the product. This is measured according to ASTM D-2863-70 except that a sample measuring ½ × ½ inch and 6 inches is used. A reading of 24 or greater is desired.

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing a polyisocyanurate foam comprising the steps of:
   I. admixing at one point from separate sources:
      A. an organic polyisocyanate,
      B. a diol having an equivalent weight of 30 to 100,
      C. a catalytic composition comprising:
         1. an alkali metal carboxylate which is a saturated aliphatic mono-carboxylic acid salt of an alkali metal,
         2. polyoxyethylene polyol having a molecular weight between 150 and 450 in the presence of a blowing agent,
   II. applying continuously the mixture comprising A, B, and C to a moving substrate, and then,
   III. recovering the polyisocyanurate foam adhering to the substrate
      wherein the equivalent ratio of A:B is 2:1 to 6:1, wherein the catalytic composition comprises from 0.01 to 5 weight percent of the polyisocyanurate foam.

2. A process of claim 1 wherein the diol is selected from the group consisting of ethylene glycol, diethylene glycol, propylene glycol, dipropylene glycol, 1,4-butane diol, and 1,3-propane diol.

3. A process of claim 1 wherein the catalytic composition additionally comprises co-catalysts.

4. A process of claim 1 wherein the alkali metal carboxylate is one of the Formula III:

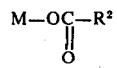   III wherein M is an alkali metal and $R^2$ is alkyl of 2 to 30 carbon atoms.

5. A process of claim 1 wherein the alkali metal carboxylate is the alkali metal salt of a saturated aliphatic monocarboxylic acid having from 2 to 30 carbon atoms.

6. A process of claim 5 wherein the alkali metal is potassium.

7. A process of claim 5 wherein the alkali metal carboxylate is potassium-2-ethyl hexoate.

8. A process of claim 1 wherein the catalytic composition has a viscosity of 200 to 800 centipoises at 25°C.

9. A process of claim 1 wherein the polyoxyethylene polyol is the ethylene oxide condensate of a lower polyhydric alcohol.

10. A process of claim 9 wherein the polyoxyethylene polyol is one of Formula IV:

   IV wherein $n$ is an integer from 3 to 10 inclusive.

11. A process for producing a polyisocyanurate foam comprising the steps of:
   I. admixing at one point from three separate sources:
      A. a mixture of polymethylene polyphenyl isocyanates of Formula I, wherein n is an integer from 0 to 8 and the polyisocyanates have an equivalent weight of 120 to 180 and a functionality of 2.1 to 3.2 and the mixture has a viscosity of 250 to 2500 centipoises at 25°C,
      B. ethylene glycol or diethylene glycol, wherein the ration of A:B is in the range of 3:1 to 5:1,
      C. a catalyst composition comprising:
         1. potassium 2-ethyl hexoate
         2. polyoxyethylene glycol having a molecular weight of 200 to 300 wherein the weight ratio of potassium 2-ethyl hexoate to polyoxyethylene glycol is in the range of 1:2 to 1:6,
         3. 2, 4 6-tris (dimethylaminomethyl) phenol, 200 to 800 centipoises at 25°C, and is present to an extent of 0.1 to 2 weight percent of the polyisocyanurate foam,
   in the presence of fluorotrichloromethane present to an extend of 5 to 20 weight percent of the polyisocyanurate foam, in the presence of polydimethylsiloxane-polyoxyalkylene block copolymers present ot an extent of 0.1 to 2 weight percent of the polyisocyanurate foam, II. applying continuously the mixture comprising A, B, and C to a moving substrate, and then, III. recovering the polyisocyanurate foam adhering to the substrate.

12. A process for producing a polyisocyanurate foam comprising the steps of:

I. admixing at one point from separate sources:
   A. an organic polyisocyanate,
   B. a diol having an equivalent weight of 30 to 100,
   C. a catalytic composition comprising:
      1. an alkali metal carboxylate which is a saturated aliphatic mono-carboxylic acid salt of an alkali metal,
      2. a compound of Formula IV:

$HO-(CH_2CH_2O-)_nH$  IV wherein n is an integer from 3 to 10 inclusive,

II. applying continuously the mixture comprising A, B, and C to a moving substrate, and then, III. recovering the polyisocyanurate foam adhering to the substrate wherein the equivalent ratio of A:B is 2:1 to 6:1, wherein the catalytic composition comprises from 0.01 to 5 weight percent of the polyisocyanurate foam.

13. A process for producing a polyisocyanurate foam comprising the steps of:

I. continuously admixing at one point from separate sources:
   A. an organic polyisocyanate
   B. a diol having an equivalent weight of 30 to 100,
   C. a catalytic composition comprising
      1. an alkali metal carboxylate which is a saturated aliphatic mono-carboxylic acid salt of an alkali metal,
      2. a compound of Formula IV:

$HO-CH_2CH_2O_nH$  IV wherein $n$ is an integer from 3 to 10 inclusive, to form a mixture comprising A, B and C, wherein the equivalent ratio of A:B has a specific value between 2:1 and 6:1, wherein the amount of catalytic composition is varied independently of the ratio A:B such that the catalytic composition comprises from 0.01 to 5 weight percent of the polyisocyanurate foam, and then, II. continuously applying the mixture comprising A, B and C to a moving substrate, and then III. recovering the polyisocyanurate foam adhering to the substrate.

* * * * *